United States Patent [19]
Rogers et al.

[11] Patent Number: 6,080,925
[45] Date of Patent: Jun. 27, 2000

[54] CALCULATOR FOR GUITAR SCALES

[76] Inventors: John B. Rogers, 6858 Hunts Point, Queens County, Nova Scotia, Canada, B0T 1G0; William Schnare, 113 Mayfair Drive, R.R. #7, Bridgewater, Nova Scotia, Canada, B4V 3J5

[21] Appl. No.: 09/313,841

[22] Filed: May 17, 1999

[30] Foreign Application Priority Data

Mar. 3, 1999 [CA] Canada ................................. 2264315

[51] Int. Cl.[7] ................................................. G09B 15/02
[52] U.S. Cl. ................................ 84/485 R; 84/DIG. 30
[58] Field of Search ....................... 84/267, 453, 477 R, 84/478, DIG. 30, 485 R, 485 SR

[56] References Cited

U.S. PATENT DOCUMENTS

| | | | |
|---|---|---|---|
| 4,054,868 | 10/1977 | Rose | 84/478 X |
| 4,080,867 | 3/1978 | Ratanangsu | 84/477 R |
| 4,295,406 | 10/1981 | Smith | 84/478 X |
| 4,318,327 | 3/1982 | Toups | 84/477 R |
| 4,412,473 | 11/1983 | Laflamme . | |
| 4,791,848 | 12/1988 | Blum, Jr. | 84/453 |
| 4,951,544 | 8/1990 | Minamitaka . | |
| 4,961,362 | 10/1990 | Gunn . | |
| 4,969,383 | 11/1990 | Bezeau, Jr. . | |
| 5,429,029 | 7/1995 | Mendiola, Jr. . | |
| 5,639,977 | 6/1997 | Hesnan . | |
| 5,756,918 | 5/1998 | Funaki . | |

*Primary Examiner*—Stanley J. Witkowski
*Attorney, Agent, or Firm*—Henderson & Sturm LLP

[57] ABSTRACT

An electronic device in the nature of a hand-held calculator, for illustrating on an active tablature display area, simulating a guitar fingerboard, chord shapes and scale patterns across a full twelve frets is provided. The device comprises a number of manually operable basic chord and key information dials for input selections. A microcontroller means is electronically associated with the dials and the LED's, and upon actuation, the microcontroller means searches for scale and associated finger position information corresponding to the tonality requirements of the input selections, and displays that information by way of illuminating means in the appropriate areas of the active tablature display.

12 Claims, 3 Drawing Sheets

CALCULATOR FOR GUITAR SCALES

FIELD OF THE INVENTION

This invention relates to a device for indicating musical information, and more particularly, to an electronic device, in the nature of a hand held calculator, for displaying chord shapes and scale patterns.

BACKGROUND OF THE INVENTION

Every musician dreams of the day when he can stand up on stage with a band and spontaneously play a beautiful solo without having first planned or rehearsed that solo. However, in order to execute a solo in this way it is necessary to predict which scale is going to fit the chord progression which is used in the song. It is also necessary to know where to find the correct scale quickly on your guitar fingerboard or keyboard. This is not as easy as one may think, especially if the song in question contains several chords uncommon to the key in which one is playing. What this means is that the set of scale notes necessary to form your solo will change throughout the song.

The correct scale to play at any given time depends on the chord harmony which is occurring at that time. In some songs the necessary scale may change several times within the same song. How can we know which scale is correct at any given time? Well, to answer this question in musical terms, it would be necessary to delve very deeply into several aspects of music theory and unless one already has a powerful background in scale theory as well as chord theory (harmony), the explanation would probably not be understood. Even musicians with an extensive education in music find that there is a great deal of memorization involved in order to quickly recall the correct scale for all musical situations. Becoming competent at this technique not only requires a great deal of knowledge but also a great deal of one's valuable time must be spent memorizing rules and principles. Of background interest, describing and illustrating display devices for musical instruments, there has been located Funaki U.S. Pat. No. 5,756,918, Hesnan U.S. Pat. No. 5,639,977, Mendiola, Jr. U.S. Pat. No. 5,429,029, Bezeau, Jr. U.S. Pat. No. 4,969,383 and Minamitaka U.S. Pat. No. 4,951,544. Most interestingly, is U.S. Pat. No. 4,412,473 to Laflamme, issued Nov. 1, 1983.

Laflamme discloses a hand held calculator displaying pictures of chords. This isolated fragment of music knowledge cannot tell the musician what chord to play in any given musical situation. It is up to the musician, through intensive study, to figure out for himself what to do with these chords after he sees the picture on the display. There is little incentive to invest in such an electronic device when a five dollar book of music chords will show the same information. Laflamme does not offer any features regarding how to play any of the possible different scales. By far the greatest shortcoming of Laflamme's device is its failure to unify keys, chords and their related scales The concept of unifying keys, chords and their related scales in encompassed by the name "tonality."

Laflamme's use of push buttons requires most of the available area on his faceplate. This restricts the size of his LED display. In the case of Laflamme's limited device this is adequate because his small, four fret display is intended for displaying chords only.

Thus, the invention herein related to an improved hand held calculator which provides for compact use of dial selectors allowing for chord shapes and scale patterns to be clearly shown across a full twelve frets.

SUMMARY OF THE INVENTION

Many musicians have no desire to devote years of their lives to intense study. However, up until the present time musicians have had no choice in the matter. It is now possible to have all this necessary knowledge without the need for years of intensive study. It is an object of the present invention to provide an electronic device for calculating and illustrating guitar or keyboard scales and chords.

In accordance with the present invention, an electronic device in the nature of a hand-held calculator, for illustrating on an active tablature display area, simulating a guitar fingerboard, chord shapes and scale patterns across a full twelve frets is provided. The device comprises a number of manually operable basic chord and key information dials for input selections. A microcontroller means is electronically associated with the dials and the LED's, and upon actuation, the microcontroller means searches for scale and associated finger position information corresponding to the input selections, and displays that information by way of illuminating means in the appropriate areas of the active tablature display.

It is another object of the present invention to provide for a device unifying keys, chords and their related scales. The concept of unifying keys, chords and their related scales in encompassed by the name "tonality."

It is another object of the present invention to provide for a device using dial selectors thereby registering the selections made which is advantageous when a musician is involved in a complex composition. Furthermore, this permits for a display occupying close to half of the faceplate area thereby resulting in chord shapes and scale patterns being clearly shown across a full twelve frets.

It is another object of the present invention, to provide a more complete musical teaching tool using a superior input and display design to better convey its information.

It is yet another object of the present invention, to provide an electronic device for calculating the correct totality of a soloing scale in response to varying input conditions of key and chord.

In accordance with still another object of the present invention, there is provided an electronic device for illustrating on an active tablature display area the required string and fret positions of a fretted stringed instrument to be fingered to play according to a particular scale comprising: a) a series of manually operable dials and switches associated with a corresponding chord, key and scale information; b) an active tablature display; c) indicator means; d) microcontroller means electronically associated with the chord, key and scale information and fret and string display indicators; and e) ROM means programmed with resulting scale information corresponding to fret and string position information.

In accordance with still another object of the present invention, there is provided a method for finding fingering locations on a musical instrument of a fretted type for playing a selected music scale comprising the steps of: a) manually positioning dials and switches corresponding to chord, key and scale information; b) processing said information electronically; and c) displaying said processed information on an active tablature display having indicator means.

Further objects and advantages of the present invention will be apparent from the following description, wherein preferred embodiments of the invention are clearly shown.

BRIEF DESCRIPTION OF THE DRAWINGS

The present invention will be further understood from the following description with reference to the drawings on which.

DETAILED DESCRIPTION OF THE INVENTION

Reference hereinafter will be made to a guitar scale calculator but it should be noted that the concept also applies to a keyboard, the difference being that the LED display on a keyboard scale calculator would indicate notes and chords in a format adapted to keyboard users.

Figure 1:
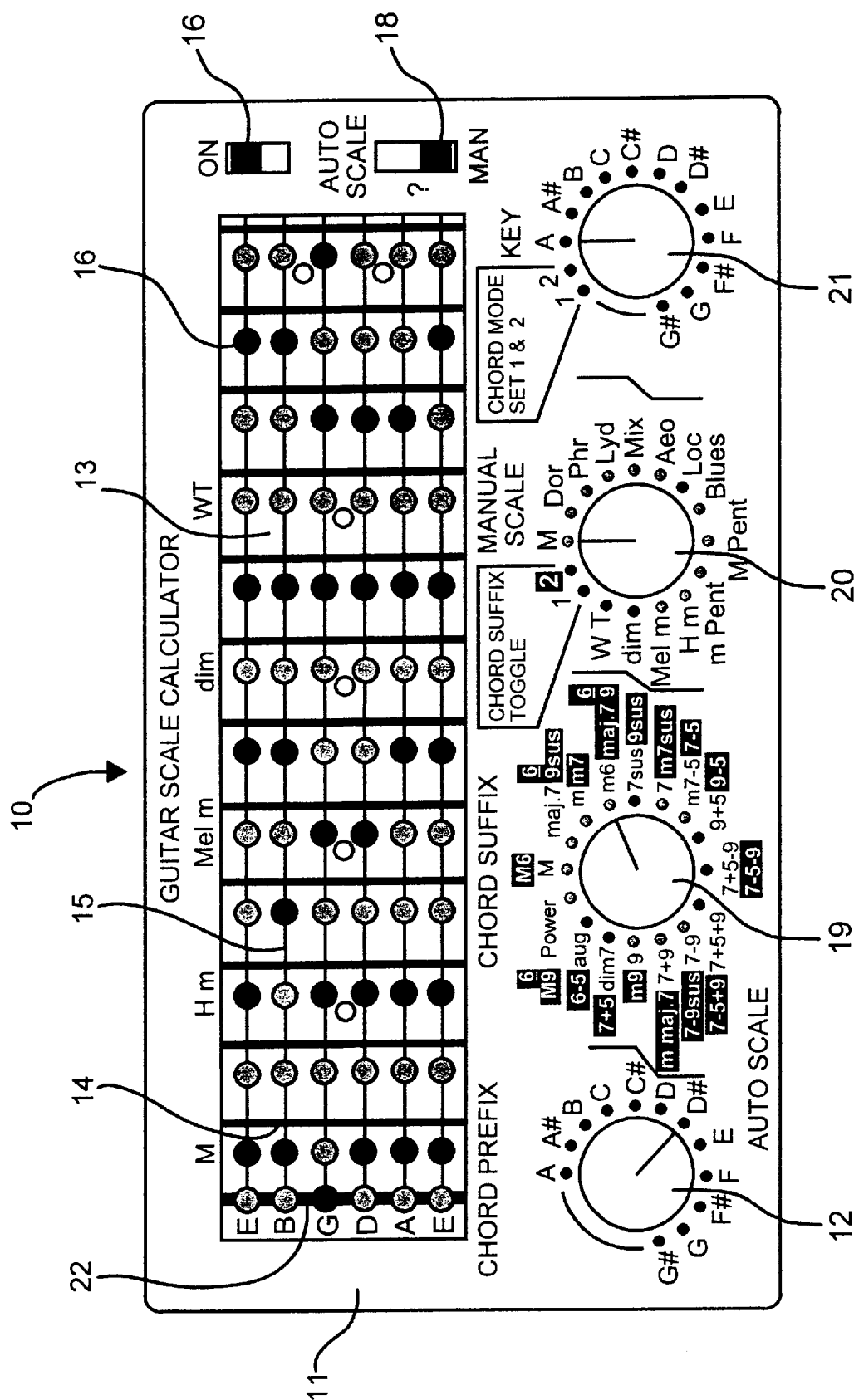
FIG. 1 is a plan view of the face of an example embodiment of the electronic device and display of the present invention.

Referring to FIG. 1, there is shown an example embodiment of the electronic device 10 according to the invention. The device 10 is comprised of a frame 11 on which are mounted a series of manually operable selector dials 12, 19, 20 and 21, each dial being associated with corresponding chord, scale and key information. A visual representation, namely an active tablature display area 13, of the frets 14 and strings 15 of the fretted instrument, in this case a guitar, over a range of twelve frets 14 is provided. Indicator means 16, being LEDs, are associated with the fret and visual representation, each of the string 15 finger positions for each of the frets 14 which are to indicate on which frets 14 and strings 15 of a particular scale a particular musical piece is to be played. An on/off switch 17 is provided for indicating when the device is on and operational.

The manually operated selector dials 12, 19, 20 and 21 are provided on the face of the device 10, the function and operation of which is now detailed below.

The guitar scale calculator, or device 10, is capable of the following four modes:

1. Auto Scale Mode: Automatically calculates and displays correct scales for soloing.

2. Auto Scale Type ? Mode: Names the type of scale shown in Auto Scale.

3. Manual Scale Mode: Allows fast access to the most common scales and modes.

4. Chord Mode: Displays four different forms of the most used chords in music.

THE TRI-MODE SWITCH

The TRI-MODE switch 18 is located directly below the on/off switch 17 on the upper right side of the front panel of the device 10. This switch enables access to three of the four modes mentioned above.

1. In AUTO SCALE MODE the musician tells the guitar scale calculator 10 what chord is occurring and in which key he is playing. The guitar scale calculator then automatically displays the correct scale.

2. In AUTO SCALE MODE, the ? position allows the musician to identify the type of scale that AUTO SCALE is displaying (Major "M"—Harmonic Minor "H m"—Melodic Minor "Mel m"—Diminished "dim"—Whole Tone "WT").

This setting will activate a single flashing LED under the appropriate scale name at the top of the active tablature display.

3. MANUAL SCALE MODE allows direct manual access to any of the guitar scale calculator's scales and modes. Manual Scale mode is used when the musician knows what scale he needs but wants to verify what the scale looks like.

WHEN USING AUTO-SCALE MODE

First, the Tri-Mode switch is set to the Auto Scale position. If the desired chord is Am7 then A is the prefix and m7 is the Suffix. The prefix is entered by setting the Chord Prefix selector 12 to the note A. Then the Chord Suffix selector 19 is turned to m/m7. In order for Auto Scale mode to find the correct scale the musician must select one of the two chord suffix selections on Dial 19. He can choose m7 which is color coded white by turning the Chord Suffix Toggle (Dial 20) to the number(2). Note that the number(2) is color coded white to match the white m7 chord found on the Chord Suffix selector (Dial 19). If the song is in the Key of G, the musician turns the Key selector (Dial 21) to G. The active tablature display 13 will immediately become illuminated, indicating the proper scale to use in the solo at that time (while the Am7 chord is occurring in the key of G). If the musician does not recognize the name of the scale which Auto Scale is displaying, he can move the Tri-Mode switch 18 to Auto Scale Type ?. The name of the scale will be indicated at the top of the active tablature display 13 by an illuminated LED 16.

THE SPECIAL CASE OF POWER CHORDS WHEN USING AUTO SCALE MODE

Power chords are probably the most commonly used chords in modern commercial music. Consequently, musicians have a great need for solo options during the occurrence of power chords. Unfortunately, most musicians are not aware of the many options for soloing with power chords. Most chords have only one or two possible scale options in any musical situation. This is not the case with power chords, and this is one of the main reasons why so many knowledgeable musicians often to solo with power chords.

Because of the fact that power chords have numerous scale options, it is not wise to restrict this chord type to only one scale choice. Instead, the guitar scale calculator 10 has been designed to provide numerous creative options of dynamic solo coloration by supplying the musician with vast scale options for power chords. These are the steps:

1. Set the Tri-Mode switch 18 to Auto Scale (Automatic Scale Mode).

2. Set the Chord Prefix selector (Dial 12) to match the root of the power chord being played at that moment.

3. Set the Chord Suffix selector (Dial 19) to any setting which has an orange dot. All positions which have an orange dot are valid scale choices for use with power chords.

4. Set the Chord Suffix Toggle on Dial 20 to either number (1) or (2) and then select either the white or black chord suffix at any orange dot setting on Dial 19.

5. Set the Key selector (Dial 21) to the appropriate key setting.

WHEN USING MANUAL SCALE MODE

The guitar scale calculator 10 allows the musician to manually select an active tablature display of any of its 14 scale types. The musician simply dials in his preferred scale type using the Manual Scale selector (Dial 20) and then dial in the correct key on the Key selector (Dial 21).

These are the steps:

1. Set the Tri-Mode switch 18 to Man (This activates Manual Scale Mode).

2. Set the desired scale root with the Key selector (Dial 21).

3. Set the Manual Scale selector (Dial 20) to the desired scale position.

For example: If the musician wants a C Major pentatonic scale, the Manual Scale selector (Dial 20) should be set to M Pent and the Key selector (Dial 4) should be set to C. The active tablature display 13 will then light up, indicating how to play the C Major pentatonic scale. The Manual Scale Mode should be used only when the name of the correct scale is known. When the musician is not sure of the correct scale, he can use the Auto Scale Mode and the guitar scale calculator 10 will automatically calculate the scale he should be playing. The correct scale pattern will instantly appear on the guitar scale calculator's 10 active tablature display 13.

FINDING SCALES FOR POWER CHORDS IN MANUAL SCALE MODE

Manual Scale Mode may be used to generate scales for the purpose of soloing over power chords. Refer to the Manual Scale selector (Dial 20). Notice that eleven of the fourteen scale positions are marked with an orange dot (appearing as grey on the Dials of FIG. 1) and the remaining three positions are marked with black dots. The orange dots indicate which scales\modes may be used with power chords. The characteristic coloration of a solo will depend on the scale selection. After having selected the scale type on the Manual Scale selector (Dial 20), the guitarist then sets the Key selector (Dial 21 ) to match the power chord prefix.

WHEN USING CHORD MODE

In CHORD MODE (Dial 21) the guitar scale calculator is a valuable chord dictionary. The chord formations displayed on the guitar scale calculator are the most commonly used chords in music. Four choices are available for each chord type.

Chords can exist in two forms. One of those forms is the familiar solid chord, where all notes are played at the same time. The guitar scale calculator 10 displays solid chords as a pattern of flashing LEDs 16.

The second form of chord is known as a chord arpeggio, where the chord is played one note at a time sequentially as a sort of melody. Chord arpeggios are executed by playing all or any part of the displayed notes in Chord Mode both flashing and non-flashing.

TO ACTIVATE CHORD MODE

The musician selects the desired chord prefix using the Chord Prefix selector (Dial 12). Select the desired chord suffix using the Chord Suffix selector (Dial 19). Dial 20 is then set to Chord Suffix Toggle within the yellow border and select (1) or (2) in order to choose the desired chord suffix color. Dial 21 must be set to Chord Mode within the yellow border and select Set 1 or Set 2. The Set 1 position displays two forms of the selected chord with a flashing LED pattern. Set 2 displays an additional two chord forms of the same selected chord.

The Chord Suffix Toggle (Dial 20) has two positions color coded black (1) and white (2). These two settings are used in reference to the Chord Suffix selector (Dial 19) which is also color coded black and white. For example, when the Chord Suffix selector (Dial 19) is set to the top M/M6 position and the Chord Suffix Toggle (Dial 20) is set to the black (1) position, the guitar scale calculator will display a major chord (Black print on the Chord Suffix selector (Dial 19). If the Chord Suffix Toggle (Dial 20) is then changed to the white (2) position, the guitar scale calculator will display a Major 6 chord (White print on the Chord Suffix selector (Dial 19). Similarly, these same two color coded options are available for each of the sixteen positions on the Chord Suffix selector (Dial 19) for a total of thirty-two completely different chord types. Should the musician forget to turn Dial 20 to the Chord Suffix Toggle position, a vertical chasing LED 16 alert will point directly to the Chord Suffix Toggle (yellow box) as a reminder that Dial 20 must be set to Chord Suffix Toggle (1) or (2) so that Chord Mode becomes activated. A chasing light alert will also appear if the Chord Prefix selector (Dial 12) or the Key selector (Dial 21) is set to unused selector positions (curved black bars).

The Tri-Mode switch is disabled when Chord Mode is selected. Once the musician has found the chords he intends on using, he turns Dial 21 away from the Chord Mode position in the yellow border. This will re-enable the Tri-Mode switch 18, thus allowing the Auto Scale and Manual Scale Modes to function.

THE GUITAR SCALE CALCULATOR'S ACTIVE TABLATURE DISPLAY

The guitar scale calculator 10 has an active tablature display 13 which simulates a guitar fingerboard. As in standard tablature, the six horizontal lines represent the six strings of your guitar. The low E string is on the bottom and the other strings are situated as indicated by the letters E, A, D, G, B and E shown to the left of the Nut 22. (The nut 22 is the thick vertical line at the left of the fingerboard.). The thin vertical lines to the right of the nut 22 represent the metal frets 14 on your guitar. The display contains 78 miniature LEDs 16 (Light Emitting Diodes) which may be ON or OFF at any given time. In Auto-Scale Mode and Manual Scale Mode flashing LEDs 16 indicate the root notes of the scale. This feature is very useful for fast identification of the scale root note and also for locating the position of other scale notes relative to the root note. Note that flashing LEDs 16 and constantly illuminated LEDs 16 are valid scale notes and may be included in your solo. In Chord Mode, flashing LEDs 16 indicate legitimate chord patterns to be used in solid chord formations.

THE FINGER BOARD WRAP AROUND

Because of the fact that the guitar fingerboard repeats after the twelfth fret, it is redundant to include more than twelve frets 14 in the guitar scale calculator's 10 active tablature display 13. As a consequence, any valid open string notes will be repeated in the same pattern at the twelfth fret. This is known as the fingerboard wrap-around effect. Occasionally, as a result of this wrap-around effect, the musician may find that certain chords are broken into segments. One of these segments will be situated near the nut 22 and the other segment will be situated near the twelfth fret. If this occurs, the Chord Prefix selector (Dial 12) can be turned two or three notches in either direction. The chord shape in question will then appear in its normal configuration.

ABBREVIATIONS ON THE CHORD SUFFIX SELECTOR (Dial 12 on FIG. 1)

For the purpose of clarity: here are some meanings for abbreviations used on the Chord Suffix selector 19:

M means major. In most cases this setting can also be used for the following chords: maj.7 maj.9 add9 6thadd9 maj.7add6 maj.9add6 6th m means minor chord −5 means b5 (flat five)

+5 means #5 (sharp five)

M 6 means that this setting may be used for major chords or major 6 chords.

maj7 means major chord with 7 added.

−9 means b9 (flat nine)

+9 means #9 (sharp nine)

m7 means that this setting may be used for minor chords or minor 7th chords dim means diminished aug means augmented (the 5 has been raised)

7 means the chord contains b7 of the scale.

For purposes of improvised solos: some of the dial positions cover more than just one musical situation. For example: when the Chord Suffix selector (Dial 19) is set to 7, this setting will also work for ordinary major chords. The following table shows other chords which are also covered by a specific dial selection.

| Dial selection: | Other chords covered by this dial selection |
| --- | --- |
| M | Power chords |
| M.6 | major or power chords |
| maj7 | major chords or power chords |
| 6 | |
| 9sus | major sus chords |
| m | Power chords |
| m7 | minor or power chords |
| m6 | minor or power chords |
| maj.9add6 | Major or power chords |
| m7−5 | diminished chords |
| 7 | major or power chords |
| m7sus | minor sus or power chords |
| 7sus | major sus or power chords |
| 9sus | major sus or power chords |
| 9+5 | 7+5 or augmented chords |
| 9−5 | 7−5 or augmented chords |
| 7−9 | 7th or major or power chords |
| 7+9 | 7th or major or power chords |
| 9 | 7th or major or power chords |
| m9 | m7 or minor or power chords |
| dim7 | diminished chords (in most cases) |
| 7+5 | augmented chords |
| 7−5 | augmented chords |
| 6 | |
| 9 | major or power chords |

For sake of clarity, hereinafter is a listing of the abbreviations on the manual scale selector (Dial 20 on FIG. 1). We also include below the meanings of the abbreviations used on the Manual Scale selector (Dial 20).

M. means Major Scale (same as Ionian Mode)

Dor means Dorian Mode

Phr means Phrygian Mode

Lyd means Lydian Mode

Mix means Mixolydian Mode

Aeo means Aeolian Mode

Loc means Locrian

Blues means Blues Scale

M Pent means Major Pentatonic Scale m Pent means minor Pentatonic Scale

H m means Harmonic minor Scale mel m means Melodic minor Scale dim means Diminished Scale W T means Whole Tone Scale

AUGMENTED CHORDS

Although true augmented chords occur only on I and IV, sometimes in practical music augmented chords appear in other positions. Because of this there is included as part of the device 10 other options covering all possible situations.

THE GUITAR SCALE CALCULATOR IS ALSO FOR BASS GUITARS WITH EAGD TUNING

All bass players are very familiar with the fact that the strings of the electric bass are E, A, D and G which is identical to the four biggest strings of the guitar. This means that bass players can also tap into the power of the guitar scale calculator. The base player ignores the two small strings 15 (B and E) on the active tablature display 13. He is then looking at a simulation of the bass guitar fingerboard. The guitar scale calculator 10 provides the bass player with a vast arsenal of chord arpeggios, scales and modes which can add interest to any song.

Figure 2:
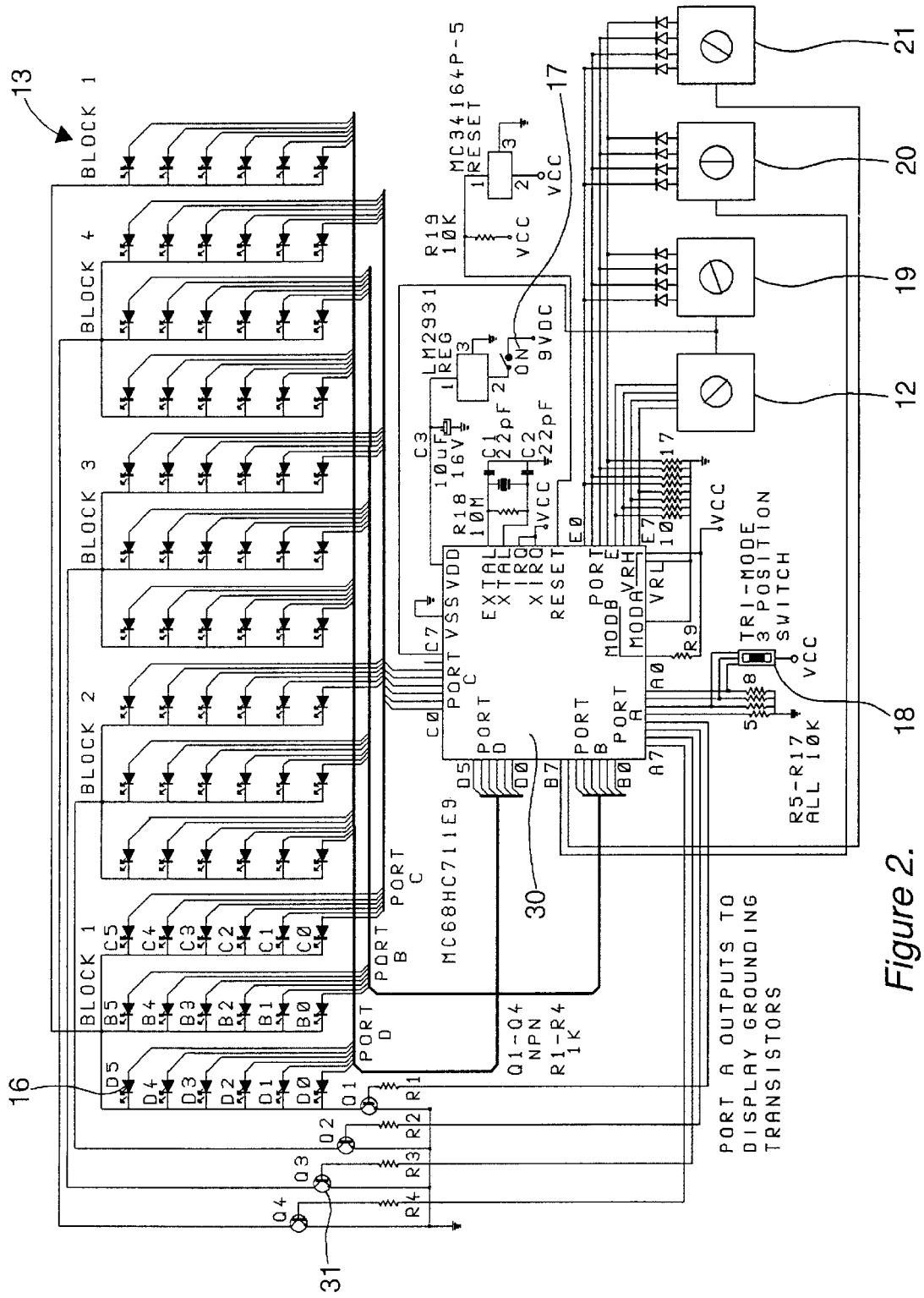
FIG. 2 is a circuit diagram of the logic and display features of the electronic device of the present invention.

Turning to the circuit diagram of FIG. 2, it is seen that the device 10 is provided with a microcontroller 30, which is fed information from rotary dial selectors 12, 19, 20 and 21, which include information as previously described. A read only memory means (ROM) is provided within the microcontroller means 30, programmed with information regarding key, chord and scale combinations with related fret 14 and string 15 finger positioning. The microcontroller means 30 is electronically associated with display grounding transistors 31 and fret and string finger position indicator LEDs 16.

Once the information regarding key, chord and scale, if applicable, is input, a search of the ROM for fret and string position information corresponding to the information input is done resulting in information being displayed through illumination of the appropriate fret and string position indicator LEDs 16 on the active tablature display area 13. This way, visible indication is given on the tablature display 13 of the strings 15 and frets 14 positioning in order for a selected scale or chord pattern to be achieved.

In operation, the microcontroller 30 obtains from the ROM the combined information of keys, chords and scales, if applicable, analyzes the input parameters and provides a result by illuminating the LEDs 16 of the active tablature display area 13 corresponding to the proper fret 14 and string 15 finger position to be taken.

It can be seen on FIG. 2 that the entire circuitry and logic system of the device 10 transforms input signal entered through selector dials 12, 19, 20 and 21, and switch 18, into accurate visual LED 16 signals at fret 14 and string 15 display of scales thereby selected. The circuit diagram of FIG. 2 is representative of the circuitry and logic system of the device 10 illustrated in FIG. 1.

Although the present embodiment of the guitar scale calculator utilizes a Motorola MC68HC711 E9 8-bit microcontroller to operate the inputs and outputs of the guitar scale calculator, it should be noted that a wide selection of microcontrollers are available which can satisfy the data processing and input/output parameters of the guitar scale calculator. The inputs consist of four hexadecimal rotary dip switch dials and a sequential three position selector switch (Tri-Mode). Each rotary dip switch is capable of sending a 4-bit binary pattern to input Port E of the MC68HC711E9.

The binary output pattern on each rotary dip switch is as follows:

| Pins-8421 |
| --- |
| 0 = 0000 |
| 1 = 0001 |
| 2 = 0010 |
| 3 = 0011 |
| 4 = 0100 |
| 5 = 0101 |
| 6 = 0110 |
| 7 = 0111 |
| 8 = 1000 |
| 9 = 1001 |
| A = 1010 |
| B = 1011 |
| C = 1100 |
| D = 1101 |
| E = 1110 |
| F = 1111 |

The microcontroller selectively energizes the rotary dip switches with connecting output pins defined as PORTB pins 6 and 7, and PORTC pin 7. Once energized, the selected rotary dip switch will transmit one of the user selected binary codes shown above, each of which can represent a unique key, chord or scale selection for input to PORTE. Rotary dip switches 19, 20 and 21 as shown in the circuit schematic diagram(FIG. 2) are all connected to the same bus. It is therefore necessary to isolate these rotary switches from one another with signal diodes to prevent code mixing between the rotary switches. The CPU of the microcontroller compares the input value on PORTE to a lookup list in ROM. Once a match is found, the corresponding ROM data array containing scale or chord patterns can be accessed and sent to the active tablature display. The Tri-Mode switch selects basic modes of operation rather than establishing exact key, chord and scale matches as in the case of the rotary dip switch dials. As can be seen in the circuit schematic of FIG. 2, the three least significant bits 0, 1 and 2 on PORTA serve as data inputs for the Tri-Mode switch. When pin 0 is high(+5V~) Manual Scale Mode is selected. When pin 1 is high Auto Scale Type ? is selected. When pin 2 is high Auto Scale Mode is selected.

Once the above mentioned input selectors have been read by the microcontroller and the matching data array has been located, a multiplexing display sequence routes the scale or chord pattern found in the data array to the active tablature display. The multiplexing illumination sequence occurs as four blocks of LEDs. Block 1 contains twenty-four LEDs. Block 2 contains eighteen LEDs. Block 3 contains eighteen LEDs. Block 4 contains eighteen LEDs. The display block multiplexing takes place in the order of Block 1, Block 2, Block 3, Block 4. Although only eighteen or twenty four LEDs are lit at any instant in time, the entire display appears to be uniformly lit due to the persistence of vision of the human eye as the rapid scan rate progresses sequentially through each LED display block and then repeats.

By utilizing a multiplexed display concept the microcontroller pin count required to operate the display is dramatically reduced. By referring to FIG. 2 one can see that a seventy eight LED display can be fully controlled by only eighteen output pins(PORTD, PORTB, PORTC) for scale pattern selection and four output pins(PORTA) to activate the grounding transistors for each display block. Display Block 2 can be used as an example to better illustrate the process. In this case PORTD, PORTB and PORTC each contribute their respective 6 bit scale pattern to one row of Block 2. Pin 5 on PORTA then goes high(+5V~)activating NPN transistor Q2 which grounds out display Block 2 and permits all LEDs with positive signals from PORTD, PORTB and PORTC to illuminate. As this same process cycles through all four display blocks, additional segments of the complete scale pattern residing in the ROM data array are accessed and assigned to each display block, thereby providing a full twelve frets of scale information on the active tablature display.

The brief "on" pulse of each multiplexed display block greatly contributes in extending battery life while still providing adequate illumination for the active tablature display. The Motorola MC68HC711E9 microcontroller is capable of supplying sufficient drive current to illuminate the LED display without the need for additional driver chips. As a result, the guitar scale calculator circuit board is relatively compact.

An LCD graphics display module could also serve as an active tablature display for the guitar scale calculator. It would offer lower power consumption. This is always a factor in battery powered systems. However, an LED display matrix is more cost effective as well as being more visible in darker environments. The present embodiment of the guitar scale calculator has an LED matrix display. Substituting alternative display technologies or other input methods(push buttons) does not alter the essential function or intent of the guitar scale calculator.

Figure 3:
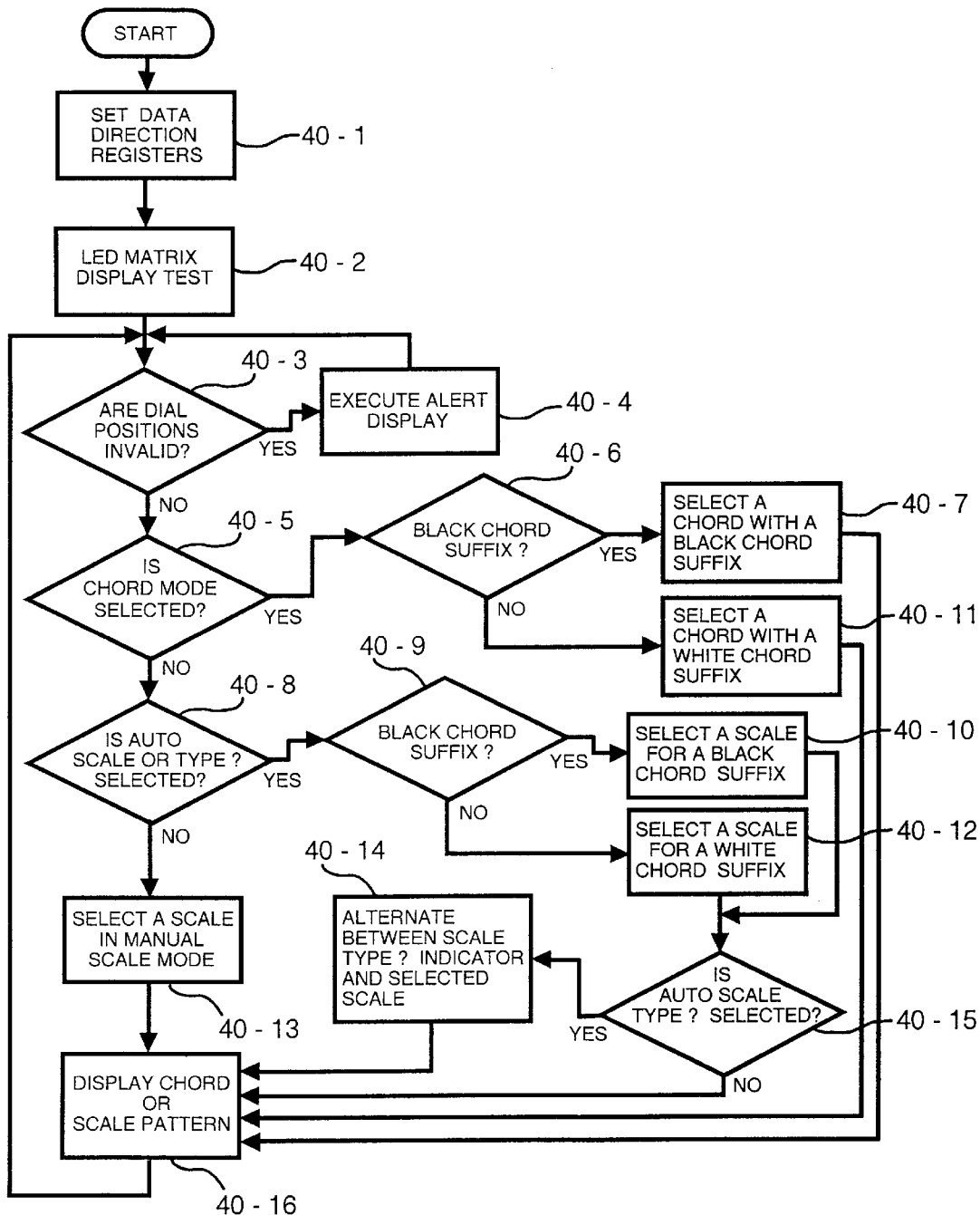
FIG. 3 is a flow diagram of the operation of the logic system of the embodiment of FIG. 1 according to the present invention.

Referring to FIG. 3, the flow diagram details more specifically the different stages of operation of the logic system illustrated in FIG. 1 and the circuitry of FIG. 2. Once the data direction registers are set 40-1 and that the LED matrix display test is run 40-2 routines 40-3 to 40-15 forming an iteration loop in which the key, chord and scale, if applicable, combinations are analyzed, resulting in a display 40-16.

A method is also provided for finding fret 14 and string 15 fingering locations on a musical instrument of a fretted type for playing a selected musical scale whereby dials and switches 12, 19, 20, 21 a nd 18 are manually positioned corresponding to a selection of keys, chords and scales, which is then processed via microcontroller 30 with the results displayed on the active tablature display 13 of the device 10 through LEDs 16.

Thus it is apparent that there has been provided in accordance with the invention an electronic device in the nature of a hand held calculator that fully satisfies the objects, aims and advantages set forth above.

While the above preferred embodiment of the present invention is applied to the fret board of a string instrument, it should be clear to those skilled in the art that the present invention can be readily and easily adapted for use with other families of musical instruments, such as, but not exclusive to, piano or organ keyboards.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed is:

1. An electronic device for illustrating on an active tablature display area the required string and fret positions of a fretted stringed instrument to be fingered to play according to a particular scale comprising:

a. a series of manually operable dials and switches associated with a corresponding chord, key and scale information;

b. an active tablature display;

c. indicator means;

d. microcontroller means electronically associated with the chord, key and scale information and fret and string display indicators; and e. ROM means programmed with resulting scale information corresponding to fret and string position information.

2. A device according to claim 1, wherein the active tablature display area is of a twelve fret range.

3. A device according to claim 1, wherein the instrument is a guitar.

4. A device according to claim 1, wherein the instrument is a bass with E A D G tuning.

5. A device according to claim 1, wherein one of the dials corresponds to a selection of chord prefix.

6. A device according to claim 1, wherein one of the dials corresponds to a selection of chord suffix.

7. A device according to claim 1, wherein one of the dials corresponds to a manual scale selector and chord suffix toggle.

8. A device according to claim 1, wherein one of the dials corresponds to a key and chord mode selector.

9. A device according to claim 1, wherein one of the switches corresponds to a scale mode switch.

10. A device according to claim 1, wherein dials permit access to the scale options provided by power chords.

11. A device according to claim 1, wherein an on/off switch is provided.

12. A method for finding fingering locations on a musical instrument of a fretted type for playing a selected music scale comprising the steps of:

a. manually positioning dials and switches corresponding to chord, key and scale information;

b. processing said information electronically; and c. displaying said processed information on an active tablature display having indicator means.

* * * * *

UNITED STATES PATENT AND TRADEMARK OFFICE
CERTIFICATE OF CORRECTION

PATENT NO. : 6,080,925
DATED : June 27, 2000
INVENTOR(S) : John B. ROGERS and William SCHNARE It is certified that error appears in the above-indentified patent and that said Letters Patent is hereby corrected as shown below:

Figure 1, the On Switch, replace reference number "16" with --17--.

Figure 3, block 40-3, replace "Are Dial Positions Invalid?" with --Are Any Dial Positions Invalid?--.

Col. 4, line 42, delete "to".

Col. 5, line 13, replace "(Dial 4)" with --(Dial 21)--.

Col. 6, line 44, replace "your" with --a--.

Col. 8, line 12, replace "EAGD" with --EADG--.

Col. 8, line 52, replace "signal" with --signals--.

Col. 10, line 31, delete "that".

Col. 10, line 32, replace "forming" with --form--.

Col. 10, line 40, replace "a nd" with --and--.

Signed and Sealed this

Seventeenth Day of April, 2001

Attest:

NICHOLAS P. GODICI

*Attesting Officer*   *Acting Director of the United States Patent and Trademark Office*